(12) United States Patent
Fontanella

(10) Patent No.: US 6,879,135 B2
(45) Date of Patent: Apr. 12, 2005

(54) SWITCHING-TYPE, INDUCTIVE DC-DC CONVERTER WITH IMPROVED EFFICIENCY

(75) Inventor: Luca Fontanella, Venezia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 294 days.

(21) Appl. No.: 10/147,290

(22) Filed: May 15, 2002

(65) Prior Publication Data

US 2002/0196003 A1 Dec. 26, 2002

(30) Foreign Application Priority Data

May 17, 2001 (EP) .......................................... 01830312

(51) Int. Cl.[7] .............................................. G05F 1/10
(52) U.S. Cl. ....................... 323/222; 323/284; 323/224
(58) Field of Search ................................ 323/222, 224, 323/282, 284

(56) References Cited

U.S. PATENT DOCUMENTS

| 5,473,526 | A | * | 12/1995 | Svensson et al. ............. 363/60 |
| 5,617,015 | A | | 4/1997 | Goder et al. ................ 323/282 |
| 5,907,235 | A | * | 5/1999 | Blumenkrantz et al. ..... 323/222 |
| 6,437,545 | B2 | * | 8/2002 | Sluijs .......................... 323/222 |

FOREIGN PATENT DOCUMENTS

| EP | 0 647 011 | 4/1995 |
| FR | 2 790 616 | 9/2000 |

OTHER PUBLICATIONS

Christiansen, D. et al. (eds)., *Electronics Engineers' Handbook*, 4th ed., McGraw–Hill, New York, 1997, pp. 19.28–19.40.

Webster, J.G. (ed)., *Wiley Encyclopedia of Electrical and Electronics Engineering*, John Wiley & Sons, Inc., New York, 1999, vol. 5, pp. 53–60.

* cited by examiner

Primary Examiner—Bao Q. Vu
(74) Attorney, Agent, or Firm—Lisa K. Jorgenson; Timothy L. Boller; Seed IP Law Group PLLC

(57) ABSTRACT

A DC—DC converter may comprise a plurality of voltage multiplying stages of the capacitive type, each multiplying stage comprising a plurality of selectively connectable boosting branches. In one embodiment, the DC—DC converter comprises an inductor connected between a supply line and a ground line through a switching transistor; a voltage multiplying circuit formed by a plurality of voltage multiplying stages of capacitive type, connected together in cascade and each having an input connected to an intermediate node between the inductor and the transistor, and an output supplying a potential equal to the potential of the intermediate node multiplied by a respective multiplication factor. Each voltage multiplying stage comprises a plurality of parallel, selectively connectable boosting branches. The number of the active boosting branches may be varied in response to the energy required by the loads.

18 Claims, 4 Drawing Sheets

SWITCHING-TYPE, INDUCTIVE DC-DC CONVERTER WITH IMPROVED EFFICIENCY

BACKGROUND OF THE INVENTION

1. Field of the Invention

The present invention relates to a switching-type, inductive DC—DC converter with improved efficiency.

2. Description of the Related Art

As is known, switching-type, inductive DC—DC converters having a Boost or Buck-Boost circuit topology generate high voltages, of some hundreds of Volts, from relatively low input voltages, of only a few Volts, using inductive type components, the loading and unloading whereof are controlled by active components including control transistors switching on and off.

For a more detailed discussion of switching-type, inductive DC—DC converters of a flyback or boost type, see for example J. G. Kassakian, M. F. Schlecht, G. C. Verghese "Principles of Power Electronics," Addison Wesley.

On this topic, FIG. 1 shows the basic circuit diagram of a switching-type, inductive DC—DC converter having a Boost type circuit topology.

As illustrated in FIG. 1, the DC—DC converter, indicated as a whole at 1, comprises an inductor 2, a control transistor 4 of NMOS type, a diode 6 and a capacitor 8.

In particular, the inductor 2 has a first terminal connected to a supply line 10 at a supply voltage $V_A$, and a second terminal connected to a drain terminal of the control transistor 4, which has a source terminal connected to a ground line 12 at a ground voltage $V_{GND}$, and a gate terminal receiving a control signal C.

The second terminal of the inductor 2, jointly with the drain terminal of the control transistor 4, forms an intermediate node 14 set at an intermediate voltage $V_I$, the value whereof is correlated to the inductance of the inductor 2 and to the current flowing in the inductor 2.

The diode 6 has an anode terminal connected to the intermediate node 14 and a cathode terminal connected to a first terminal of the capacitor 8, the second terminal whereof is connected to the ground line 12.

The cathode terminal of the diode 6, jointly with the first terminal of the capacitor 8, forms an output node 16 of the DC—DC converter 1 and supplies an output voltage $V_H$ higher than the supply voltage $V_A$.

In short, the control transistor 4 is switched on/off at a predetermined frequency, called switching frequency; when the control transistor 4 is on, a current flows between the supply line 10 and the ground line 12 through the inductor 2, that stores an electric energy correlated to the on-interval of the control transistor 4; instead, when the control transistor 4 is off, a current flows between the inductor 2, the diode 6 and the capacitor 8, so the electric energy stored in the inductor 2 is transferred to the capacitor 8, apart from any leaks.

Moreover, before the control transistor 4 can switch off, there must be sufficient electric energy stored in the inductor 2 to load the equivalent stray capacitance "seen" by the intermediate node 14 to a value such as to bring the voltage $V_I$ of the intermediate node 14, and therefore the output voltage $V_H$, to the desired value $V_O$. In mathematical terms, this can be represented by the following inequality:

$$\frac{1}{2} C_P V_0^2 \leq \frac{1}{2} L I^2 \quad (1)$$

wherein I is the current flowing in the inductor 2 when the control transistor 4 is on, $C_P$ is the equivalent stray capacitance "seen" by the intermediate node 14, the first term of the inequality represents the electric energy necessary to load the equivalent stray capacitance $C_P$ and the second term of the inequality represents the electric energy stored in the inductor 2.

As may be noted from the above inequality, in order to obtain output voltages $V_H$ of some hundreds of Volts it is necessary to make a decidedly high electric current run in the inductor 2, easily of some Amps, which consequently generates a series of problems, well known to the skilled person, the solution of which involves considerable difficulties at planning and circuit level.

Besides the problems deriving from the high value of the currents involved, switching-type, inductive DC—DC converters of the type described above have the further drawback of being able to supply only one boosted voltage, so that, when numerous different boosted voltages are required, it is necessary to resort to many distinct inductors or to inductors with many windings, one for each boosted voltage that is needed, and this involves a considerable occupation of area.

Similar problems can also be found in switching-type, inductive DC—DC converters having a circuit topology of the Buck-Boost type, which differ from Boost type ones essentially in that the positions of the inductor and of the control transistor are exchanged, that is the inductor is connected to the ground line while the control transistor is connected to the supply line.

Another prior art switching-type, inductive DC—DC converter is shown in FIG. 2.

The DC—DC converter, indicated as a whole with 20, comprises an inductor 22, a control transistor 24, and a voltage multiplying or boosting circuit 25.

In particular, the inductor 22 has a first terminal connected to a supply line 30 at a supply voltage $V_A$, and a second terminal connected to a drain terminal of the control transistor 24, which has a source terminal connected to a ground line 32 at a ground voltage $V_{GND}$, and a gate terminal receiving a control signal C.

The second terminal of the inductor 22, jointly with the drain terminal of the control transistor 24, forms a first intermediate node 34 supplying an intermediate voltage $V_I$, the value whereof is correlated to the inductance of the inductor 22 and to the current flowing in the inductor 22.

The voltage multiplying circuit 25 comprises three voltage multiplying stages of a capacitive type, cascade-connected and indicated respectively with 26.1, 26.2 and 26.3.

The voltage multiplying stages 26.1–26.3 have the same circuit structure and each comprise a boosting capacitor, indicated respectively 36.1, 36.2 and 36.3; a filtering capacitor indicated respectively 38.1, 38.2 and 38.3; and a first and a second diode, indicated 40.1, 40.2, 40.3 and, respectively, 42.1, 42.2, 42.3.

In particular, each boosting capacitor 36.1–36.3 has a first terminal connected to the intermediate node 34 and a second terminal connected to a second intermediate node, indicated respectively 44.1, 44.2, 44.3, connected to an anode terminal of the corresponding first diode 40.1–40.3 and a cathode terminal of the corresponding second diode 42.1–42.3.

The cathode terminal of each corresponding first diode 40.1–40.3 is connected to a first terminal of the respective filtering capacitor 38.1–38.3 and forms, jointly with it, an output node of the DC—DC converter 1, indicated respectively 46.1, 46.2, 46.3, supplying an output voltage, respectively $V_{H1}$, $V_{H2}$, $V_{H3}$, and connected a to a respective load 50.1, 50.2, 50.3.

Moreover, the anode terminal of the second diode 42.1 of the first capacitive multiplying stage 26.1 is connected to the ground line 32; the anode terminal of the second diode 42.2 of the second capacitive multiplying stage 26.2 is connected to the output node 46.1 of the first capacitive multiplying stage 26.1; and the anode terminal of the second diode 42.3 of the third capacitive multiplying stage 26.3 is connected to the output node 46.2 of the second capacitive multiplying stage 26.2.

Lastly, the second terminal of the filtering capacitor 38.1 of the first capacitive multiplying stage 26.1 is connected to the ground line 32; the second terminal of the filtering capacitor 38.2 of the second capacitive multiplying stage 26.2 is connected either to the ground line 32 or to the output node 46.1 of the first capacitive multiplying stage 26.1, as schematically represented in FIG. 2 with a dashed line; and the second terminal of the filtering capacitor 38.3 of the third capacitive multiplying stage 26.3 is connected either to the ground line 32 or to the output node 46.2 of the second capacitive multiplying stage 26.2, as schematically represented in FIG. 2 with a dashed line.

The second terminals of the filtering capacitor 38.2, 38.3 of the second and of the third capacitive multiplying stage 26.2, 26.3 are connected either to the ground line 32 or to the output node 46.1, 46.2 of the first and, respectively, of the second capacitive multiplying stage 26.2, 26.3 depending on the particular application for which the DC—DC converter 20 is intended, as will be better explained below.

The operation of the DC—DC converter 20 is as follows.

The control transistor 24 is switched on and off at a pre-determined switching frequency; when the control transistor 24 is on, an electric energy correlated to the on-time of the control transistor 24 is stored in the inductor 22, while when the control transistor 24 is off, the electric energy stored in the inductor 22 is transferred to the filtering capacitors 38.1–38.3, except for any leaks, causing an increase of the voltage at the terminals.

In particular, since the anode terminals of the first diodes 42.2 and 42.3 of the second and the third capacitive multiplying stages 26.2, 26.3 are connected to the output node 46.1 of the first capacitive multiplying stage 26.1, and, respectively, to the output node 46.2 of the second capacitive multiplying stage 26.2, the voltage of the second intermediate node 44.2 depends not only on the intermediate voltage $V_I$ of the first intermediate node 34 but also on the voltage of the second intermediate node 44.1, just as the voltage of the third intermediate node 44.3 depends both on the intermediate voltage $V_I$ of the first intermediate node 34 and on the voltages of the second intermediate nodes 44.1 and 44.2.

In the DC—DC converter 20, therefore, the output voltage $V_{H1}$ can reach at the most a value equal to the maximum value assumed by the intermediate voltage $V_I$, the output voltage $V_{H2}$ can reach a value equal to double the output voltage $V_{H1}$, and the output voltage $V_{H3}$ can reach a value equal to three times the output voltage $V_{H1}$.

For example, by loading the inductor 22 so that the intermediate voltage $V_I$ has a value of 100 Volts, with the DC—DC converter 20 it is possible to obtain both an output voltage $V_{H2}$ of 200 Volts and an output voltage $V_{H3}$ of 300 Volts.

In general, with n voltage multiplying stages cascade-connected as described above and equal to each other, the maximum output voltage, that is the voltage on the output node of the n-th capacitive multiplying stage, is equal to n times the maximum value of the intermediate voltage $V_I$.

While the output voltage remains the same (with respect to the DC—DC converters described previously with reference to FIG. 1), this allows the inequality (1) to be rewritten as follows:

$$\frac{1}{2n^2} C_P V_0^2 \leq \frac{1}{2} L I^2 \qquad (2)$$

which, if solved for the variable I, shows how the electric current necessary to load the stray capacity $C_P$ associated with the first intermediate node 34 is reduced by a factor n with respect to that necessary in DC—DC converters without capacitive multipliers, with consequent significant reduction of the problems at planning and circuit level, initially described, deriving from the high value of the currents involved.

Moreover, if the filtering capacitors 38.2 and 38.3 are connected to the ground line 32, the voltage at their terminals is two times and, respectively, three times the intermediate voltage $V_I$, while if they are connected to the output nodes 46.1 and, respectively, 46.2, the voltage at their terminals is equal to the intermediate voltage $V_I$. Thereby the connection of these filtering capacitors to the output nodes of the preceding voltage multiplying stage allows a reduction by a factor n in the maximum voltage of the filtering capacitors, therefore less expensive manufacturing technologies may be used by virtue of the lower bulk and lower insulation problems.

The decision to connect the filtering capacitors to the ground line rather than to the output nodes of the preceding voltage multiplying stages in the cascade therefore depends on the application for which the DC—DC converter 20 is intended, in particular it depends on any limitations on the overall occupation of area on silicon on the DC—DC converter.

Although widely used, the output voltages $V_{H1}$, $V_{H2}$, $V_{H3}$ may vary in a rather significant way when the loads 50.1, 50.2, 50.3 connected to the output nodes 46.1, 46.2, 46.3 vary.

BRIEF SUMMARY OF THE INVENTION

The present invention improves the performance obtainable with inductive DC—DC converters.

An embodiment of the present invention comprises a switching-type inductive DC—DC converter in which the voltage multiplying means comprise a plurality of parallel, selectively connectable boosting branches.

BRIEF DESCRIPTION OF THE SEVERAL VIEWS OF THE DRAWINGS

For a better understanding of the invention, a preferred embodiment is now described, purely as an example without limitation, with reference to the enclosed drawings, wherein.

DETAILED DESCRIPTION OF THE INVENTION

Figure 3:
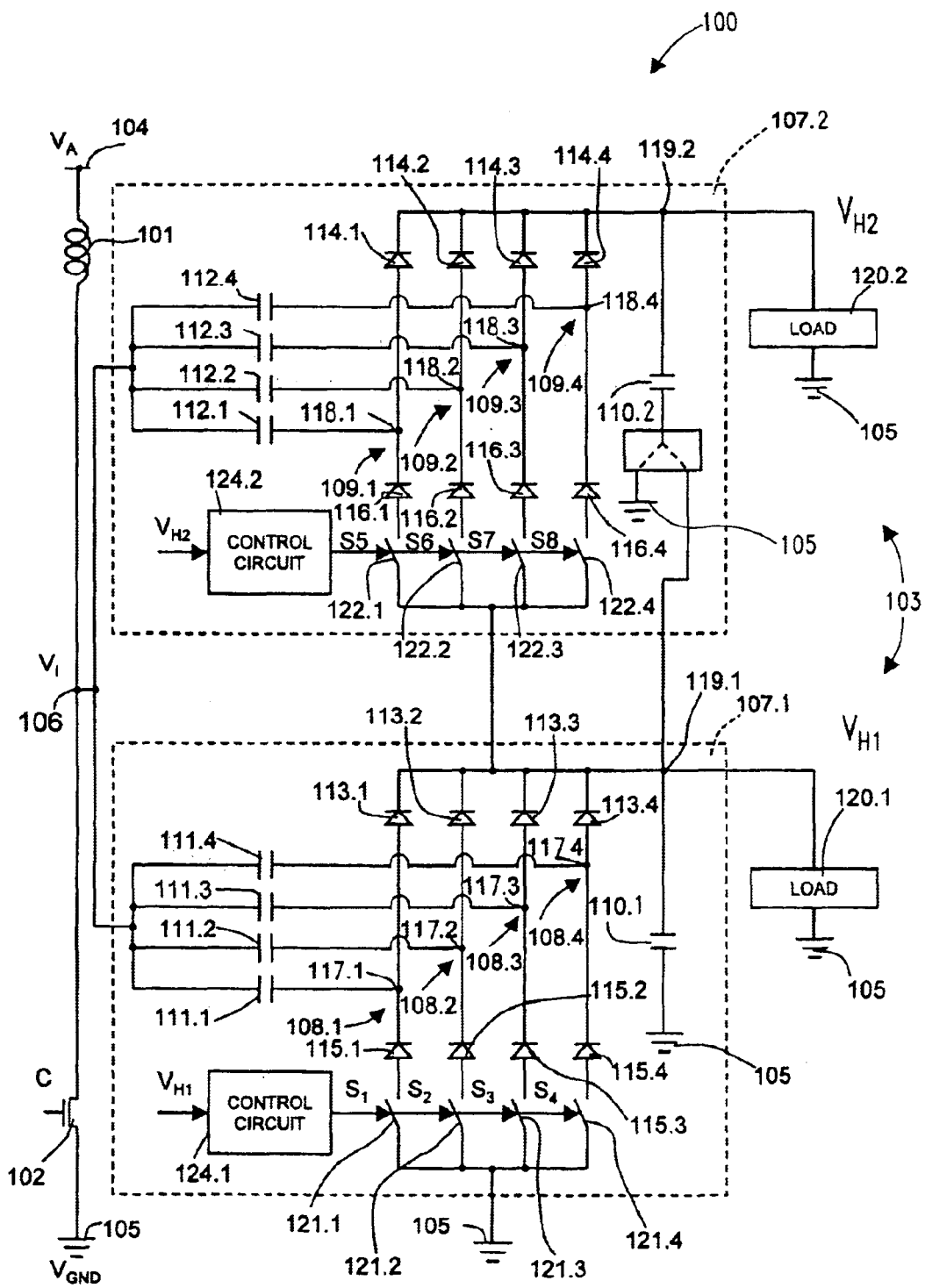
FIG. 3 shows a circuit diagram of a switching-type, inductive DC—DC converter with Boost type circuit topology that is an embodiment of the present invention.
Figure 4:
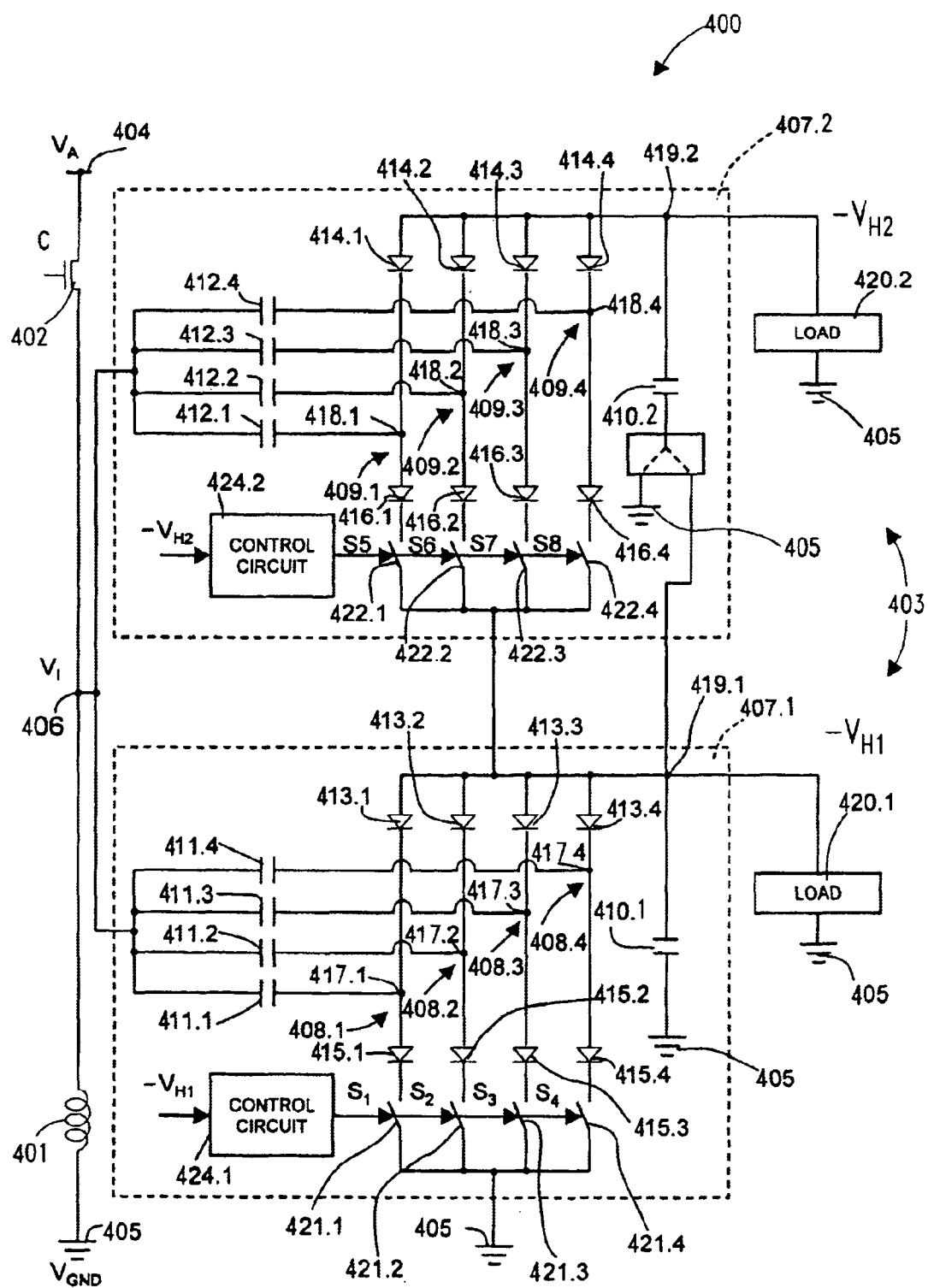
FIG. 4 illustrates an embodiment of the present invention utilizing an inductive DC—DC converter of the buck-boost type.
Figure 5:
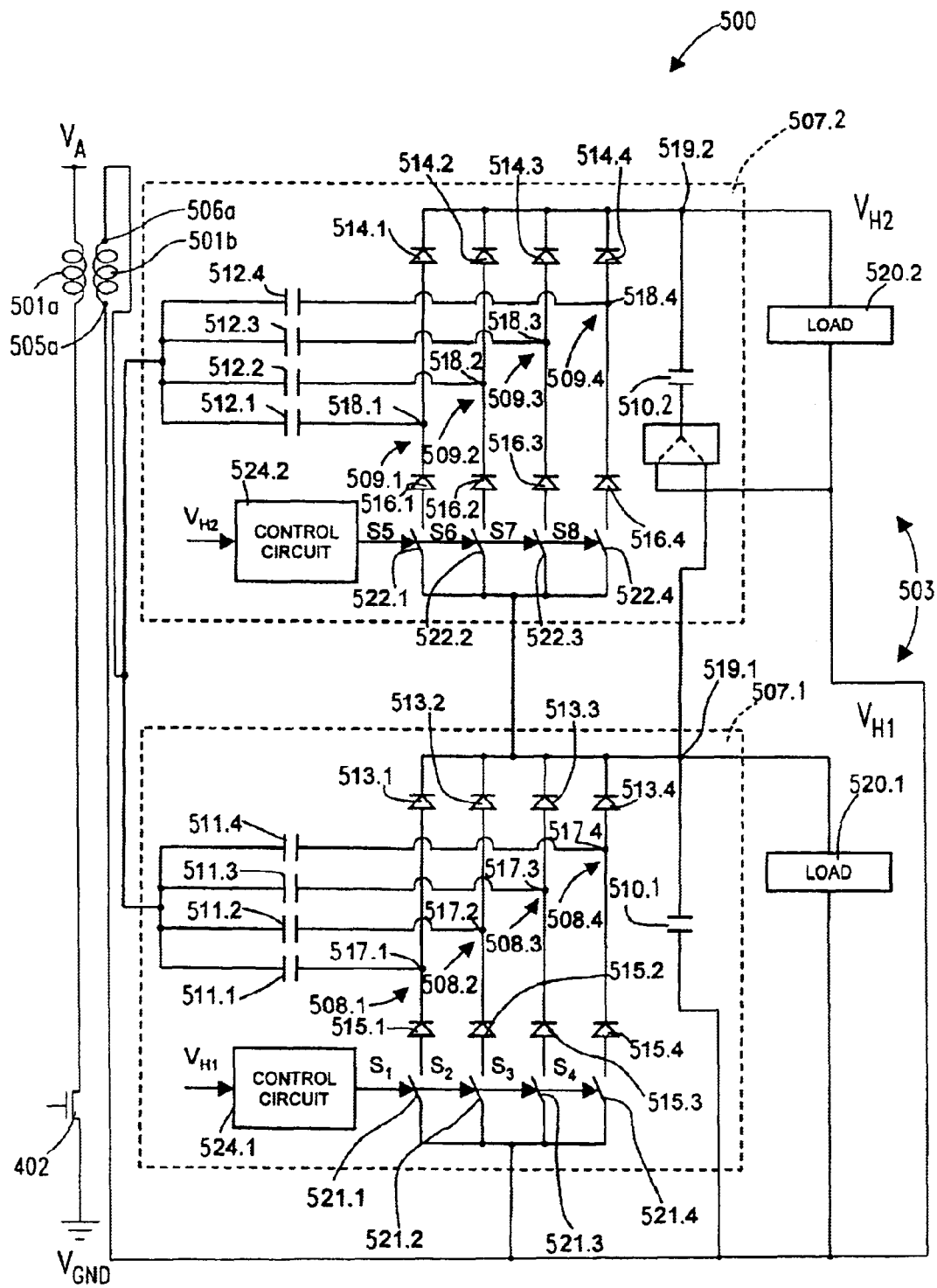
FIG. 5 illustrates an embodiment of the present invention utilizing an inductive DC—DC converter of a fly-back type in a boost configuration.

FIG. 3 shows an inductive DC—DC converter 100 of the switching type, embodying the present invention. In greater detail, the inductive DC—DC converter 100 comprises an inductor 101, a control transistor 102, and a voltage multiplying or boosting circuit 103.

In particular, the inductor 101 has a first terminal connected to a supply line 104 at a supply voltage $V_A$, and a second terminal connected to a drain terminal of the control transistor 102, which has a source terminal connected to a ground line 105 at a ground voltage $V_{GND}$, and a gate terminal receiving a control signal C.

The second terminal of the inductor 101, jointly with the drain terminal of the control transistor 102, defines a first intermediate node 106 supplying an intermediate voltage $V_I$ the value whereof is correlated to the inductance of the inductor 101 and to the current flowing in the inductor 101.

The voltage multiplying circuit 103 of the embodiment shown in FIG. 3 is formed by two voltage multiplying stages 107.1, 107.2 of capacitive type, cascade-connected. The voltage multiplying circuit 103 may comprise additional voltage multiplying stages of capacitive type (i.e. 107.3, 107.4, ... 107.n) (not shown) that are cascade-connected.

In the embodiment of FIG. 3, the voltage multiplying stages 107.1, 107.2 have the same circuit structure and each comprise a plurality of boosting branches (four of which are shown in FIG. 3 and indicated with 108.1, 108.2, 108.3, 108.4 and respectively with 109.1, 109.2, 109.3, 109.4) and a filtering capacitor 110.1, 110.2.

In particular, each boosting branch 108.1–108.4, 109.1–109.4, comprises a boosting capacitor 111.1, 111.2, 111.3, 111.4 and respectively 112.1, 112.2, 112.3, 112.4, a first diode 113.1, 113.2, 113.3, 113.4 and respectively 114.1, 114.2, 114.3, 114.4 and a second diode 115.1, 115.2, 115.3, 115.4 and respectively 116.1, 116.2, 116.3, 116.4. In detail, each boosting capacitor 111.1–111.4, 112.1–112.4, comprises a first terminal connected to the intermediate node 106 and a second terminal connected to a second intermediate node, indicated with 117.1, 117.2, 117.3, 117.4 and respectively 118.1, 118.2, 118.3, 118.4 connected to an anode terminal of the respective first diode 113.1–113.4 and respectively 114.1–114.4 and a cathode terminal of the respective second diode 115.1–115.4 and respectively 116.1–116.4. Although FIG. 3 illustrates the use of four boosting branches in each multiplying stage, the multiplying stages may comprise fewer or more boosting branches (i.e. 108.1, 108.2, ... 108.n) and each multiplying stage need not employ the same number of boosting branches.

The cathode terminal of each first diode 113.1–113.4 and respectively 114.1–114.4 is connected to a first terminal of the respective filtering capacitor 110.1, 110.2 and forms, jointly with it, a corresponding output node of the DC—DC converter 1, indicated 119.1 and respectively 119.2, supplying an output voltage indicated respectively $V_{H1}$ for the first voltage multiplying stage 107.1 and $V_{H2}$ for the second voltage multiplying stage 107.2. A load 120.1, 120.2 is connected to the output node 119.1, respectively 119.2.

Moreover, the anode terminals of the second diodes 115.1–115.4 of the first capacitive multiplying stage 107.1 are connected to the ground line 105 through respective switches 121.1, 121.2, 121.3, 121.4 while the anode terminals of the second diodes 116.1–116.4 of the second capacitive multiplying stage 107.2 are connected to the output node 119.1 of the first capacitive multiplying stage 107.1 through respective switches 122.1, 122.2, 122.3, 122.4.

The switches 121.1–121.4 of the first capacitive multiplying stage 107.1 are controlled by respective closing signals S1, S2, S3, S4 generated by a first control circuit 124.1 having an input terminal receiving the output voltage $V_{H1}$ of the first capacitive multiplying stage 107.1. Likewise the switches 122.1–122.4 of the second capacitive multiplying stage 107.2 are controlled by respective closing signals S5, S6, S7, S8 generated by a second control circuit 124.2 having an input terminal receiving the output voltage $V_{H2}$ of the second capacitive multiplying stage 107.2.

Lastly, the second terminal of the filtering capacitor 110.1 of the first capacitive multiplying stage 107.1 is connected to the ground line 105 while the second terminal of the filtering capacitor 110.2 of the second capacitive multiplying stage 107.2 is connected either to the ground line 105 or to the output node 119.1 of the first capacitive multiplying stage 107.1, as schematically represented in FIG. 3 with a dashed line.

In another embodiment, the switches 121.1–121.4 of the first capacitive multiplying stage 107.1 may be placed between the cathode terminals of the first diodes 113.1–113.4 and the output node 119.1 of the first capacitive multiplying stage itself, while the switches 122.1–122.4 of the second capacitive multiplying stage 107.2 may be placed between the cathode terminals of the second diodes 114.1–114.4 and the output node 119.2 of the second capacitive multiplying stage.

Figure 1:
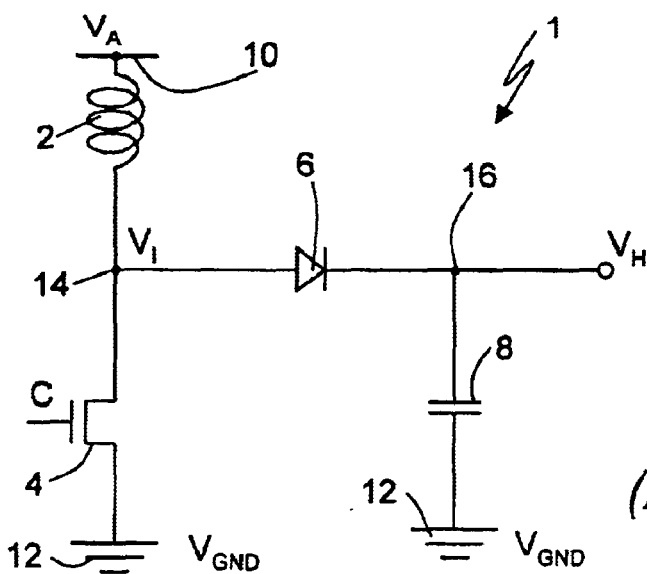
FIG. 1 shows a circuit diagram of a switching-type, inductive DC—DC converter of the prior art with Boost type circuit topology.
Figure 2:
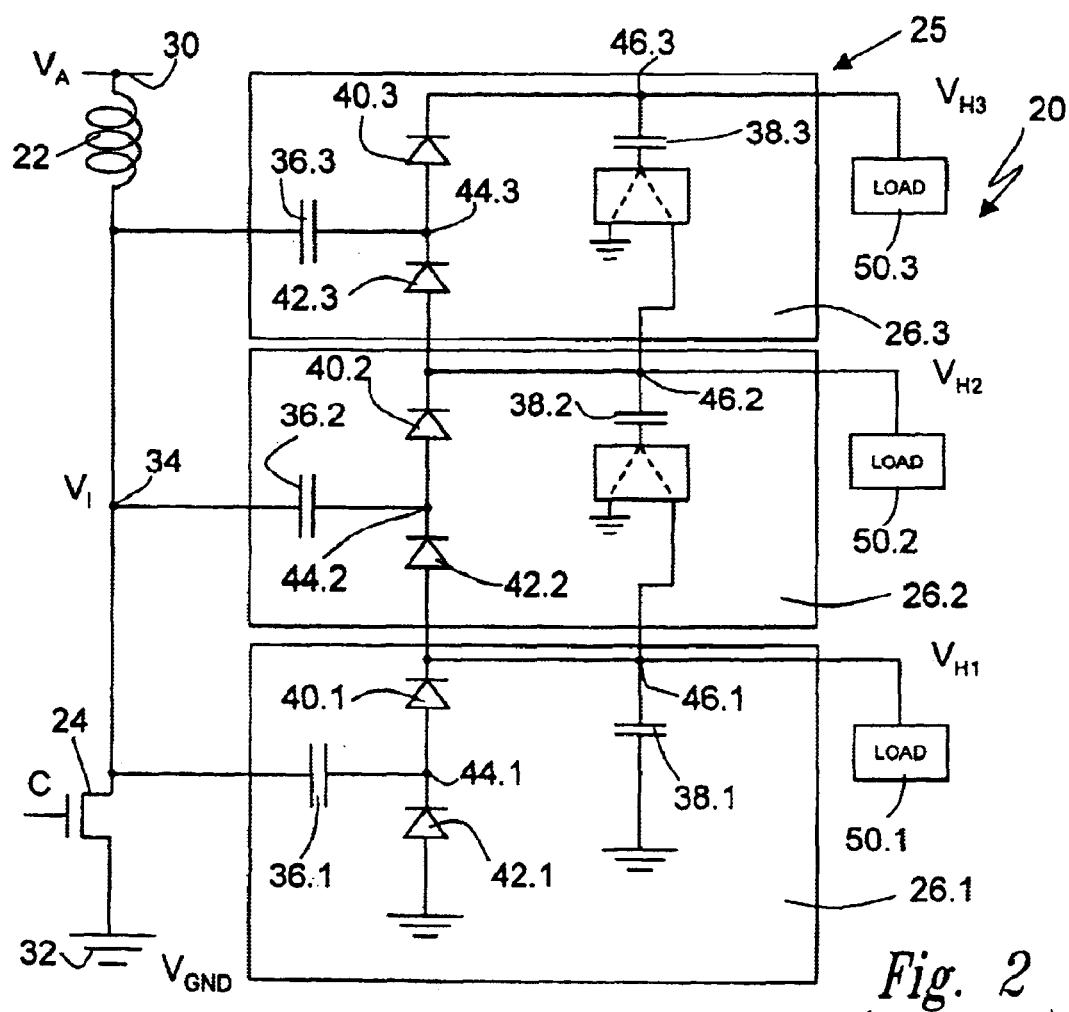
FIG. 2 shows a circuit diagram of a different switching-type, inductive DC—DC converter of the prior art with Boost type circuit topology.

The operation of the DC—DC converter 100 as embodied in FIG. 3 is similar to the operation of the DC—DC converter 20 in FIG. 2, so it will not be repeated. It will only be pointed out that in the DC—DC converter 100 the number of active boosting branches 108.1–108.4, 109.1–109.4 is determined according to the energy required by the loads 120.1, 120.2.

The energy available to the loads 120.1, 120.2 is a growing monotonic function both of the switching frequency and of the capacitance of the boosting capacitors 111.1–111.4, 112.1–112.4. Thus, when the number of boosting capacitors 111.1–111.4, 112.1–112.4, connected between the first intermediate node 106 and the second intermediate nodes 117.1–117.4, 118.1–118.4 is increased, the energy that can be transferred to the loads 120.1, 120.2 is also increased.

The control circuits 124.1, 124.2 therefore sense the values of the output voltages $V_{H1}$, $V_{H2}$ on the output nodes 119.1, 119.2 and, accordingly, generate the closing signals of the switches 121.1–121.4, 122.1–122.4.

For example, in the embodiment shown in FIG. 3 the capacitances associated with each boosting capacitor 111.1–111.4, 112.1–112.4 may be weighed in binary mode. In this way it is possible to transfer the energy required by each load 120.1, 120.2 with a minimum increase of $1/2^n$ with n=4.

Moreover, to obtain greater precision it is possible to have n boosting capacitors in the DC—DC converter 100. Although FIG. 3 illustrates an embodiment of the present invention utilizing an inductive DC—DC converter of the boost type, the present invention may also be employed in DC—DC converters having a circuit topology of the Buck-Boost type.

The advantages of a DC—DC converter circuit embodying the invention are clear from the above. In particular, it is stressed that it allows a considerable decrease of the loss of the energy transferred to the loads, considerably increasing efficiency with respect to the solutions of the prior art.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claim is:

1. A switching-type, inductive DC—DC converter comprising:
   inductive means connected through first controlled switch means between a first and a second line at a first and, respectively, at a second potential; and
   voltage multiplying means having an input connected to an intermediate node between said inductive means and said first controlled switch means and at least one output supplying an output potential correlated to an intermediate potential of said intermediate node, said voltage multiplying means comprising a plurality of selectively connectable boosting branches coupled in parallel between the intermediate node and the output.

2. A switching-type, inductive DC—DC converter according to claim 1, wherein each boosting branch comprises:
   capacitive input means connected between said intermediate node and a first node;
   second controlled switch means coupled between said first node and said output of said voltage multiplying means;
   third controlled switch means coupled between said first node and a second node; and
   fourth controlled switch means coupled between said second and third controlled switch means.

3. A switching-type, inductive DC—DC converter according to claim 2, wherein said second controlled switch means comprise first single-pole switch means and that said third controlled switch means comprise second single-pole switch means.

4. A switching-type, inductive DC—DC converter according to claim 3, wherein said first single-pole switch means comprise a first diode and that said second single-pole switch means comprise a second diode.

5. A switching-type, inductive DC—DC converter according to claim 4, wherein said first diode has an anode terminal coupled to said first node and a cathode terminal coupled to said output of said voltage multiplying means; and that said second diode has an anode terminal coupled to said second node and a cathode terminal coupled to said first node.

6. A switching-type, inductive DC—DC converter according to claim 2, further comprising a control circuit to generate control signals to control said fourth controlled switch means.

7. A switching-type inductive DC—DC converter comprising:
   a plurality of parallel, selectively-enabled capacitive boosting branches coupled to an output node; and
   a control circuit coupled to the capacitive boosting branches and structured to selectively enable the capacitive boosting branches.

8. The DC—DC converter of claim 7 wherein the control circuit is coupled to the output node.

9. The DC—DC converter of claim 7 wherein the control circuit comprises a switch.

10. The DC—DC converter of claim 7 wherein the converter is of a boost configuration.

11. The DC—DC converter of claim 7 wherein the converter is of a buck-boost configuration.

12. The DC—DC converter of claim 7 wherein the converter is of a flyback configuration.

13. The DC—DC converter of claim 7 wherein the converter comprises an inverter.

14. A method of converting a DC potential to another DC potential, the method comprising:
   storing electrical energy in an inductive circuit;
   transferring stored electrical energy from the inductive circuit to a selected number of a plurality of parallel capacitive boosting branches; and
   transferring stored electrical energy from the selected number of capacitive boosting branches to a load.

15. The method of claim 14 further comprising monitoring a potential at the load and adjusting the selected number based on the monitored potential.

16. The method of claim 14 further comprising:
   transferring stored electrical energy from the inductive circuit to a second selected number of a second plurality of parallel capacitive boosting branches; and
   transferring stored electrical energy from the second selected number of a second plurality of capacitive boosting branches to a second load.

17. A DC—DC converter comprising:
   an inductor coupled between a supply voltage node and a first node;
   a switching transistor coupled between the first node and a first reference voltage node and having a control terminal to receive a control signal; and
   a plurality of capacitive multiplying circuits, each comprising an input node coupled to the first node; an output node; a second reference voltage node; a first capacitor;
   a plurality of selectively-enabled capacitive boosting branches; and a control circuit to selectively enable the selectively-enabled boosting branches.

18. The DC—DC converter of claim 17, wherein each of the selectively-enabled boosting branches comprises: a capacitor coupled between the input node and a branch node; a first diode coupled between the branch node and the output node; and a second diode coupled between the branch node and a switch, wherein the switch is coupled to the second reference voltage node and the switch is controlled by the control circuit.

* * * * *

UNITED STATES PATENT AND TRADEMARK OFFICE
CERTIFICATE OF CORRECTION

PATENT NO. : 6,879,135 B2
DATED : April 12, 2005
INVENTOR(S) : Luca Fontanella

It is certified that error appears in the above-identified patent and that said Letters Patent is hereby corrected as shown below:

Title page,
Item [75], Inventor, "Venezia (IT)" should read -- Cusago (IT) --.
Item [73], Assignee, should be -- STMicroelectronics S.r.l., Agrate Brianza, Italy AND Hewlett-Packard Company, Boise, Idaho --.

Signed and Sealed this

Thirty-first Day of January, 2006

JON W. DUDAS
*Director of the United States Patent and Trademark Office*